United States Patent [19]

Dufresne

[11] 4,132,292
[45] Jan. 2, 1979

[54] EMERGENCY BRAKE

[76] Inventor: Jacques Dufresne, 6889 Lamont St., Montreal, Quebec, Canada, H4E 2T8

[21] Appl. No.: 818,225

[22] Filed: Jul. 22, 1977

[51] Int. Cl.$^2$ .................. F16D 65/21; F16D 49/20
[52] U.S. Cl. ........................... 188/171; 188/75
[58] Field of Search ............ 188/75, 170, 171, 196 P, 188/106 P

[56] References Cited

U.S. PATENT DOCUMENTS

| | | | |
|---|---|---|---|
| 1,455,895 | 5/1923 | Thurston | 188/171 |
| 1,991,903 | 2/1935 | Logan | 188/171 X |
| 2,065,259 | 12/1936 | Ball et al. | 188/171 X |
| 2,422,370 | 6/1947 | Schnell | 188/170 X |

*Primary Examiner*—Duane A. Reger
*Attorney, Agent, or Firm*—Raymond A. Robic; Arthur Schwartz; Francis B. Francois

[57] ABSTRACT

A brake having first and second brake support means; a brake shoe mounted on each support means intermediate the ends of each support means, each support means pivotably being mounted at one end to a fixed frame, a first spring means mounted to the other end of the second support means biasing the first and second support means, and thus the brake shoes toward each other in a braking action. First actuating means are connected to the second support means and act against the first spring means to maintain the brake shoes in a non-braking position and selectively operable to release the first spring means. A third brake support means is pivoted to one of the first and second brake support means, the third brake support means being also connected to one of the brake shoes. Second actuating means are connected between the third support means and the one of the first and second support means, the second actuating means selectively being operable to move the brake shoes to a braking position independently of the first spring means.

13 Claims, 8 Drawing Figures

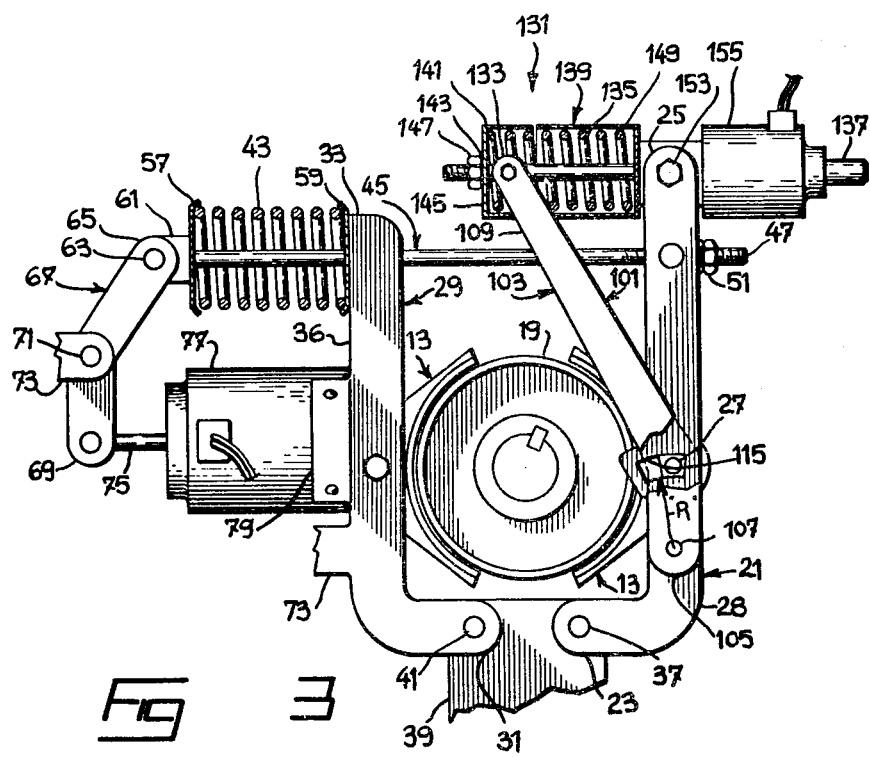
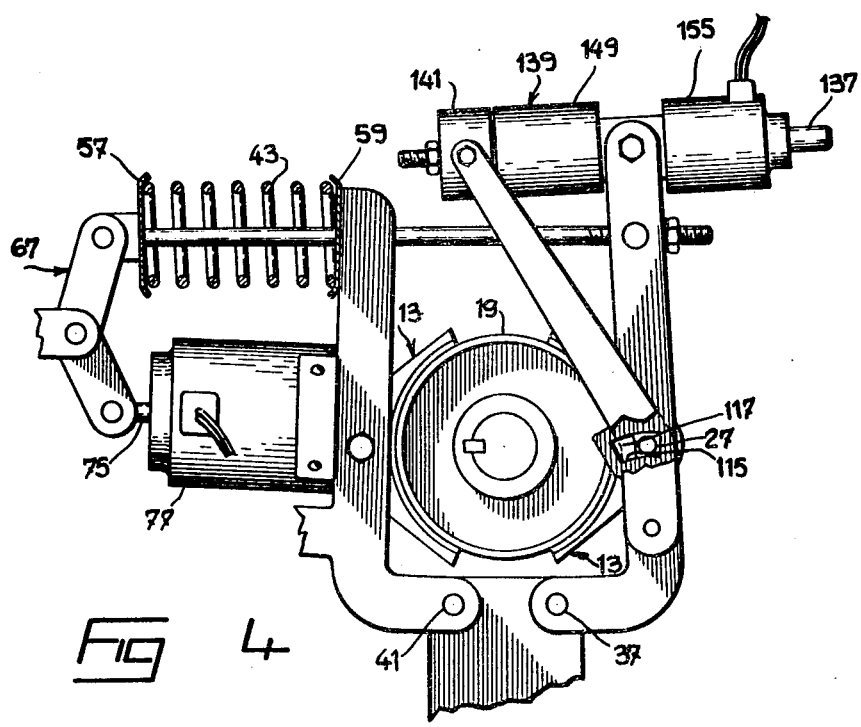

EMERGENCY BRAKE

This invention is directed to an improved brake.

The invention is particularly directed to a solenoid-type brake used on winches, which brake is provided with a back-up system in case of failure.

Solenoid-type brakes on winches are well known. These brakes use current, supplied to the winch motor, to operate a solenoid which deactuates the winch brake. When the winch motor is stopped, the solenoid is automatically cut-off to thereby actuate the winch brake.

These brakes however have no provision to apply a braking load to the winch if the solenoid fails. No simple and effective emergency brake is provided to brake the winch in the event the solenoid jams or breaks.

It is therefore the purpose of the present invention to provide a solenoid-type brake having emergency braking means if the main solenoid fails. It is also the purpose of the present invention to provide this emergency braking in a simple and inexpensive manner. This is done by utilizing many of the original brake components in the emergency brake, with some modification, thus avoiding the use of an entirely separate back-up braking system.

According to the present invention, there is provided a brake having first and second brake support means; a brake shoe mounted on each support means intermediate the ends of each support means, each support means being pivotably mounted at one end to a fixed frame, a first spring means mounted to the other end of the second support means biasing the first and second support means and thus the brake shoes toward each other in a braking action. First actuating means are connected to the second support means and act against the first spring means to maintain the brake shoes in a non-braking position and are selectively operable to release the first spring means. A third brake support means is pivoted to one of the first and second brake support means, the third support means being also connected to one of the brake shoes. Second actuating means are connected between the third support means and the one of the first and second support means, the second actuating means selectively operable to move the brake shoes to a braking position independently of the first spring means.

According to a further aspect of the invention there is provided a means for self-correcting the air-gap or space e between the brake lining 17 of each of the brake blocks 15 and the brake drum 19 when the space e becomes wider than the necessary distance due to the wear of the linings 17.

The brake may further comprise a limit switch for operating an alarm signal when the brake linings are worn to a dangerous limit.

The brake may further comprise an additional security system for permitting the smooth and progressive braking of the shaft to be braked in the event of a current failure, thus permitting the smooth normal ascending or descending movement of a load.

Embodiments of the invention will now be described in detail having reference to the accompanying drawings in which:

FIG. 3 is an elevation view of the brake, in partial cross-section, in a non-braking position;

FIG. 4 is the same view as FIG. 3 but with the brake in a normal braking position;

Figure 1:
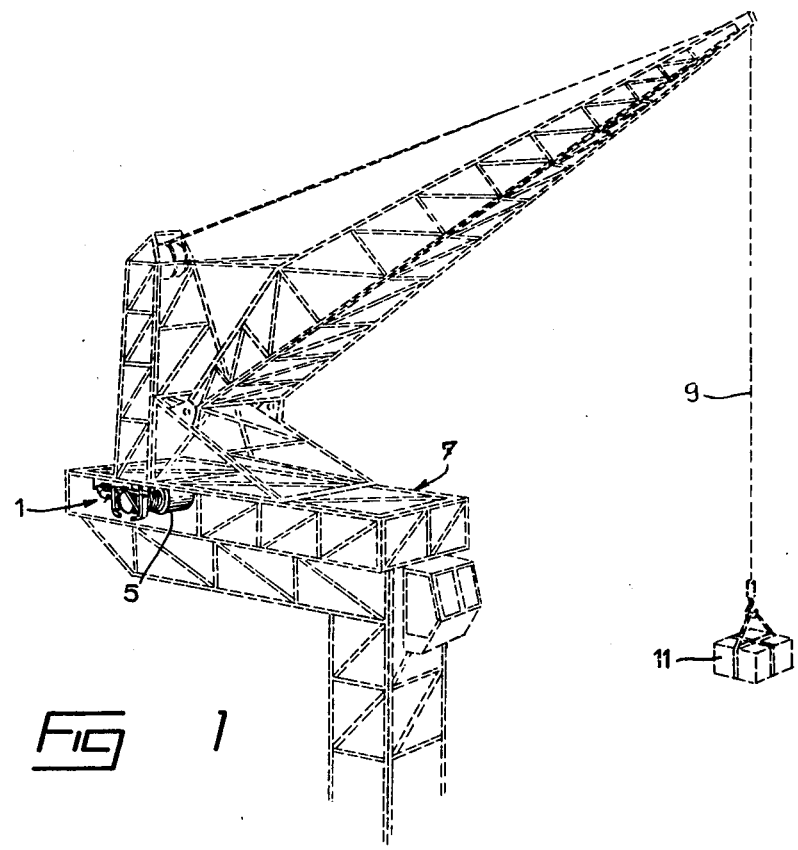
FIG. 1 is a view illustrating where the brake of the present invention is used.

The improved brake 1 shown in the figures is generally employed to brake the shaft 3 of a winch 5 in a crane 7. A cable 9 is wound about winch 5 and a motor (not shown) operates winch 5 to rotate it in either direction to wind or unwind cable 9 on or off the winch and thus raise or lower a load 11 carried by cable 9.

Figure 2:
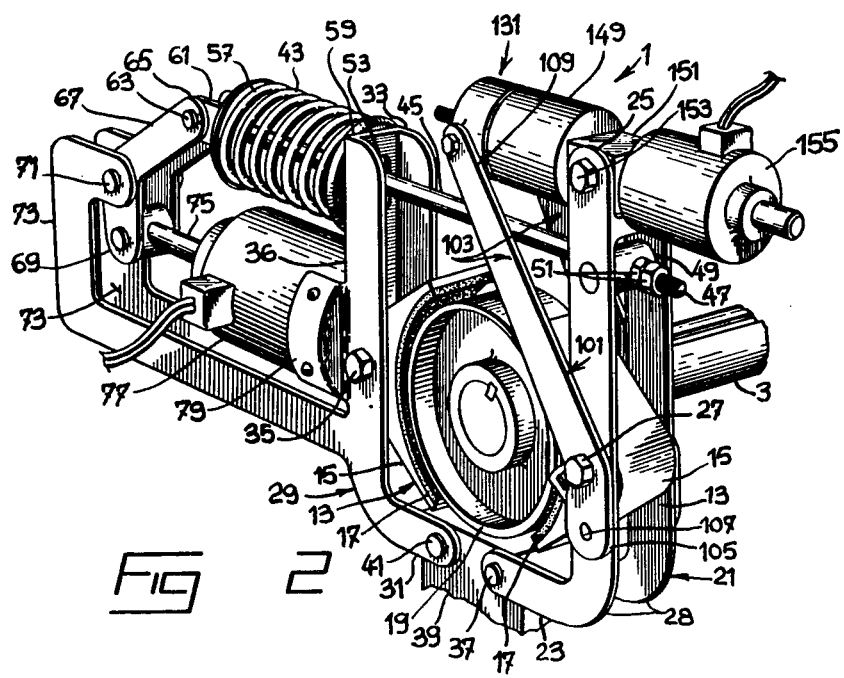
FIG. 2 is a perspective view of the brake.

The brake 1, known in the prior art and as shown in FIGS. 2 and 3, has a pair of opposed brake shoes 13. Each brake shoe comprises a brake block 15 and a brake lining 17. The brake shoes 13 are adjacent a brake drum 19 mounted on shaft 3. One brake shoe 13 is pivotably mounted to first brake support means 21, intermediate its ends 23, 25, by a pin 27. This first support means 21 comprises a pair of spaced-apart strip members 28. The other brake shoe 13 is also pivotably mounted to second brake support means 29, intermediate its ends 31, 33, by a pin 35. This second support means 29 comprises a channel member 36. The ends 23 of support strips 28 are pivotably attached by a pin 37 to a post 39 forming part of the frame of the crane 7. The end 31 of channel member 36 is also pivotably attached by a pin 41 to post 39.

A spring 43 normally biases the upper ends 25, 33 of support means 21, 29 toward each other about pins 37, 41 thus causing brake shoes 13 to bear on drum 19. The spring 43 is mounted about a rod 45. The rod 45 extends generally transversely to support means 21, 29 and has one threaded end 47 passed transversely through a block 49 which is pivotably mounted between strips 28 near their upper end 25. A pair of nuts 51 are threaded on the end 47 projecting through block 49. The rod 45 passes freely through an enlarged hole 53 in the upper end 33 of channel 36 and projects a considerable distance from it. This end of the rod carries a circular disc 57. The rod 45 projects axially from the center of the disc 57. A second circular disc 59 is loosely mounted on the projecting portion of rod 45 adjacent channel 36. Spring 43 is mounted on rod 45 between discs 57, 59.

A bracket 61 projects from the back of disc 57. The bracket 61 is pivotably connected by a pin 63 to one end 65 of a bellcrank 67. The bellcrank 67 is pivotably connected, intermediate its ends 65, 69, by a pin 71, to a pair of arms 73 extending laterally from channel 36. The other end 69 of bellcrank 67 is pivotably connected to a rod 75 projecting from a solenoid 77. The solenoid 77 is mounted on a bracket 79 attached to support means 29.

In operation, the solenoid brake 1 is activated when the motor operating the winch 5 is on. When activated, the rod 75 is extended, rotating bellcrank 67 clockwise as seen in FIG. 3 and tending to move support means 21, 29 apart, and thus moving the brake shoes 13 off drum 19 and compressing spring 43 between discs 57, 59. When the winch motor is turned off, solenoid 77 is deactivated and spring 43 is now operable to move support means 21, 29 via the linkage of bellcrank 67, arms 73, and rod 45, toward each other thus applying brake shoes 15 onto drum 19 to thereby brake winch 5.

The structure described above is known in the art. In accordance with the present invention, an improved solenoid brake 1 is provided in case solenoid 77 fails. The improved brake 1 has third brake support means 101 which comprises a pair of lever arms 103 pivotably mounted at their lower end 105 by pins 107 on strips 28 between their lower end 23 and pivot pin 27 holding brake shoe 13. The short lower end 105 of arms 103 is substantially aligned with strips 28. The arms 103 have a longer upper portion 109 which diverges away from strips 28.

In the vicinity where portions 105, 109 of arms 103 meet, bolt 27, connecting block 15 to strips 28, passes through arms 103 thereby connecting them to block 15 as well.

Figure 6:
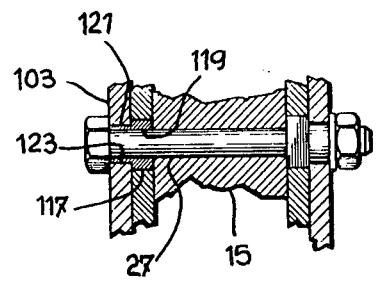
FIG. 6 is a detail cross-sectional view taken along line 6—6 in FIG. 5.

To provide for relative movement between arms 103 and strips 28, the strips 28 are provided with a lost motion connection with bolt 27. More particularly, strips 28 are each provided with arcuate slots 115 with the center for their radius "R" of curvature, being pins 107. A sliding substantially rectangular block or connector 117 is mounted in each slot. Bolt 27 passes through a bore 119 in blocks 117 as shown in FIG. 6. Each block 117 also has a cylindrical projecting collar 121 mounted in a circular bore 123 in arms 103. The bolt 27 passes through collar 121 and bore 119 in each block 117 on the arms on each side of block 15.

Actuating means 131 are connected to the free ends 133, 25 of arms 103 and strips 28 respectively, for moving the ends away from each other. These actuating means 131, in one embodiment as shown in FIGS. 2 to 5, comprise a solenoid actuated spring 135. The spring 135 can be mounted about a solenoid rod 137 within a split cylindrical casing 139. One section 141 of the casing 139 is pivotably connected between the free ends 133 of arms 103 by bolts 143. The rod 137 passes axially through the end wall 145 of casing 139 and a bolt 147 is threaded onto the end of rod 137 projecting from wall 145.

The other section 149 of split casing 139 is connected to a block 151, (see FIG. 2) which is pivotably connected by bolt 153 between, and to the ends 25 of strips 28. A solenoid 155 is attached to block 151 and solenoid rod 137 extends through block 151 into solenoid 155.

Figure 5:
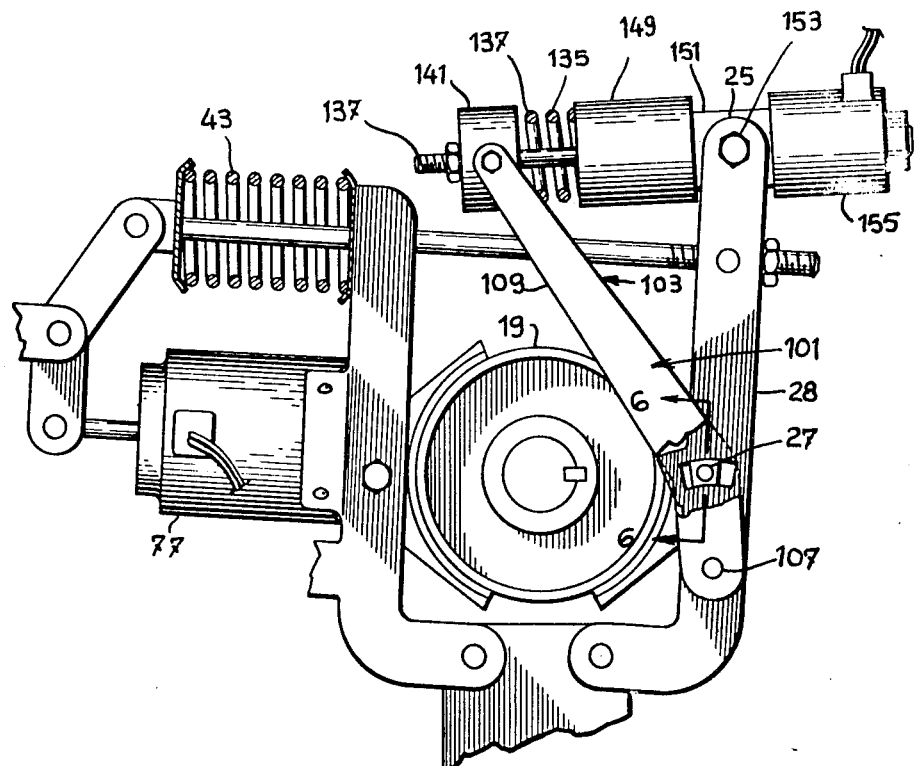
FIG. 5 is the same view as FIG. 3 but with the brake in an emergency braking position.

In operation, solenoid 155 is normally actuated thus drawing rod 137 to the right as viewed in the Figures, keeping spring 135 compressed, and blocks 117 to the right in arcuate slots 115. This position is maintained regardless of whether solenoid 77 is actuated. However, if there is a failure in solenoid 77 so that the brake will normally not work, the solenoid 155 can be quickly deactuated by the operator. Spring 135 then expands as shown in FIG. 5 moving the ends 133, 25 of arms 103 and strips 28 apart. In effect, arms 103 pivot about pin 107 away from strips 28, and carry brake block 15 with them to brake on drum 19. Strips 28 at the same time move clockwise, thus, via rod 45, bellcrank 67, arms 73, and channel 36, pulling opposed brake block against drum 19 also. It is thus seen that the emergency solenoid 155 employs at least part of the original linkage system in applying the brakes.

Figure 7:
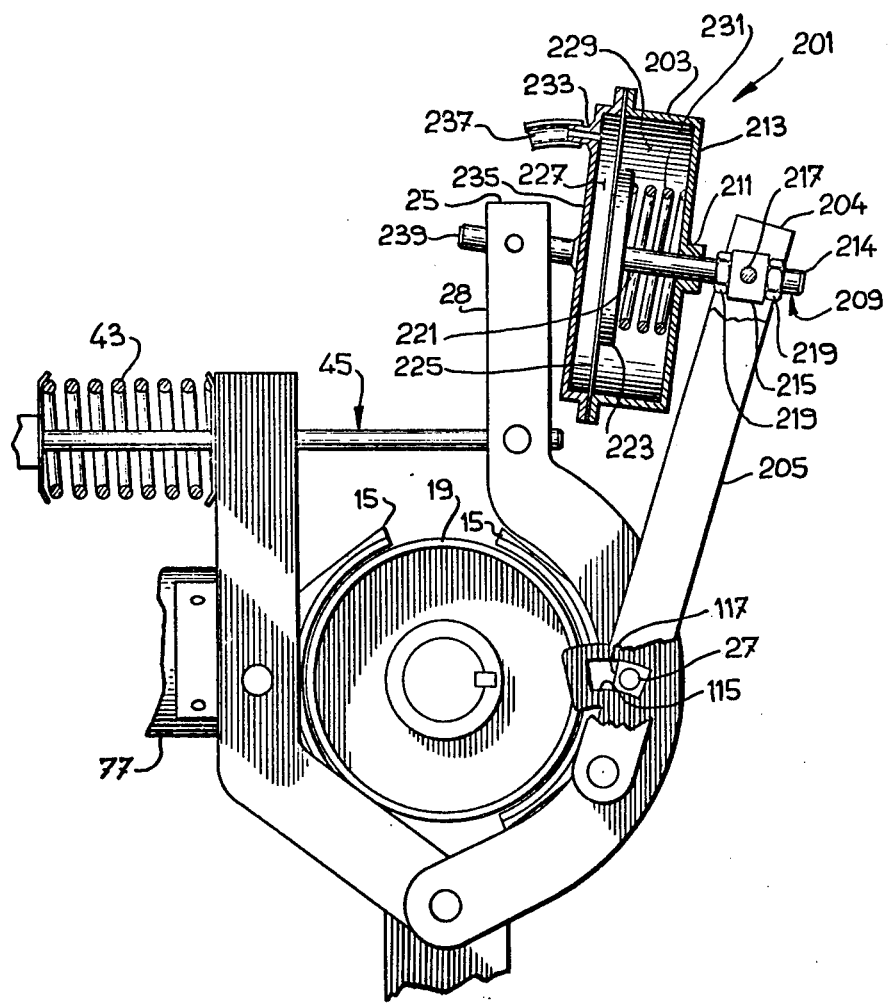
FIG. 7 is an elevation view, in partial cross-section, of another embodiment of the brake.

Instead of a solenoid actuated spring 135 for moving the arms 103, the brake can employ fluid pressure means 201 as shown in FIG. 7. In this embodiment, a cylindrical casing 203 is mounted between the ends 204, 25 of arms 205 and strips 28 respectively. A first, movable rod 209 projects through a central collar 211 in one end 213 of casing 203 and has its projecting end 214 passed through a block 215 which is pivotably mounted by pins 217 (one only shown) between arms 205. The projecting end 214 is threaded and nuts 219 are threaded on the end 214 on either side of block 215. The other end 221 of rod 209 is attached to a plate 223 which, in turn, lies adjacent to, and is fixed to, a flexible membrane 225 which divides the casing into two cylindrical chambers 227, 229. A compression spring 231 is located in chamber 229 about rod 209 between plate 223 and end wall 213 of casing 203.

An inlet port 233 is provided in the other end wall 235 of casing 203. A hose, 237, directing pressurized fluid can be connected to port 233 which communicates with chamber 227.

A rod 239 extends from the center of the other end wall 235 of casing 203 and is attached to the ends 25 of strips 28 in the same manner that rod 209 is attached to arms 205.

In operation, when the solenoid 77 of the brake fails, fluid under pressure is admitted through port 233 into chamber 227 and the casing 203 is pushed to the left, against the spring 231 as viewed in FIG. 7. This pivotally moves the ends 25 of strips 28 away from the ends of arms 205 causing the brake to be applied. When emergency braking is no longer required, the chamber 227 is vented through line 237 and spring 231 returns the casing 203 to the position shown in FIG. 7 thus allowing the strips and arms to move toward each other thereby releasing the brakes.

Figure 8:
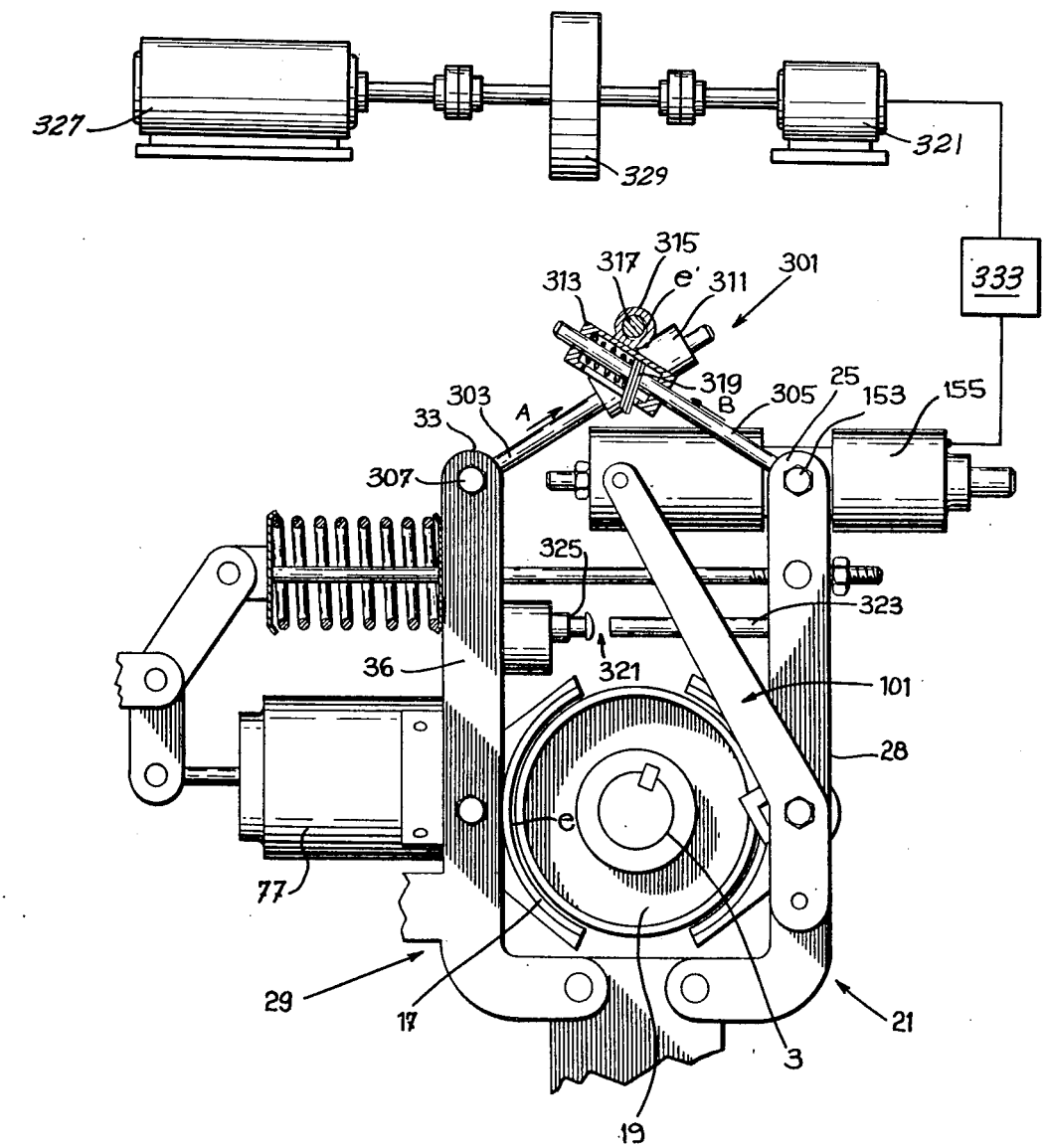
FIG. 8 is a side view of the brake and the self-correcting means according to the present invention.

Referring to FIG. 8, the self-correcting means 301 is shown as comprising two rods 303 and 305, one of the rods 303 having one of its ends pivotally connected by means of a pivot 307 to the end 33 of the channel member 36, the other end of the rod 303 being provided with a unidirectional self-adjusting element 311 which makes it possible to rod 303 to be displaced in one direction only, namely in the direction indicated by arrow A in FIG. 8. The unidirectional self-adjusting element 311 prevents the back displacement of rod 303 from a determined position, in a direction opposite to the direction shown by arrow A.

In the same way the second rod 305 has one of its ends pivotally connected by means of bolt 153 to the ends 25 of strips 28. The other end of rod 305 is provided with a unidirectional self-adjusting element 313 identical to the unidirectional self-adjusting element 311 of rod 303. Each of the unidirectional self-adjusting elements 311 and 313 is provided with a ring element 315, both of the ring elements being pivotally mounted with a certain clearance e' about a shaft 317. The clearance e' that the ring elements 315 have with the shaft 317 is equal to the air-gap e provided between the linings 17 and the brake drum 19. This clearance e' is important to the proper operation of the unidirectional self-adjusting elements 311 and 313 as will be explained in later paragraphs.

As in the case of rod 303, rod 305 can be displaced only in one direction i.e. according to arrow B and once in such a displaced position it is firmly gripped by the unidirectional self-adjusting element 313 and cannot be displaced backward without the release of release means 319 explained later.

In operation, when the brake linings 17 are worn, it is evident that the air-gap e between the linings 17 and the shaft 3 becomes wider. However, due to the presence of the self-correcting means 301 such an air-gap e is automatically adjusted to the desired distance every time that the linings are brought together to brake the shaft 3. In fact, when the linings 17 at each side of shaft 3 are brought towards each other rods 303 and 305 are displaced according to arrows A and B, respectively, due to the moving towards each other of the support means 21 and 29, respectively. Now, supposing that, in a first stage, the lining elements 17 are not worn and are in their braking position, i.e. they are in contact with the brake drum 19, the air-gap e does not exist anymore. This air-gap e being equal to the clearance e' between the ring elements 315 and the shaft 317, each rod 303 or 305 with its unidirectional self-adjusting element is moved forwardly according to arrows A or B by a distance e' and not more than this clearance e' because they are prevented of doing so by the fact that the linings cannot move further towards each other due to the presence of brake drum 19. However, in a second stage, if linings 17 are worn, it is evident that the air-gap e becomes wider on each side of the brake drum 19. In such a case for the linings 17 to come into contact with the brake drum 19 the rods 303 and 305 are displaced according to arrows A and B, respectively, more than the width of air-gap e or the clearance e'. Such an additional displacement is possible due to the presence of the unidirectional self-adjusting elements 311 and 313 on each rod 303 and 305, respectively. Thus, it is evident that in such an operation the rods 303 and 305 of the self-correcting means 301 are displaced first by the amount of the clearance e' or air-gap e and then by the amount of the width of the worn portions of the linings 17. Now, when the braking operation is stopped and the linings 17 are displaced back to their non-braking position, the additional displacement of rods 303 and 305 cannot be moved back in directions opposite to arrows A and B, respectively, due to the presence of the unidirectional self-adjusting elements 311 and 313 as above explained. This additional displacement actually corresponds to the worn portions of the linings 17 and when the brake linings 17 are back to their normal non-braking positions, the distance or air-gap e between these linings 17 and the brake drum 19 is automatically adjusted to its initial value by the clearance e' which, as above explained, is equal to the air-gap e.

If the linings are further used, rods 303 and 305 are further displaced unidirectionally according to arrows A and B, respectively, thus providing for the worn portions of the lining. Once they have been displaced in the unidirectional permitted direction, they cannot be displaced back to their initial position and therefore the worn portions are thus compensated.

In order to prevent the total wearing of the linings 17 without noticing it, there is provided a limit switch 321 consisting of two parts, a first part 323 being connected to the first support means 21 and a second part 325 being connected to the second support means 29. When the linings 17 are worn to a dangerous limit, during a braking operation when the support means 21 and 29 are inclined towards each other, part 323 of the limit switch 321 comes into contact with part 325 and operates an alarm signal.

As a further precaution, there is provided for the entire system of the brake as shown in the embodiment of FIG. 8 an additional security system comprising an auxiliary motor 327 connected to a flywheel 329. The flywheel 329 is connected to an alternator 331 which is itself connected by means of a relay 333 to the solenoid 155. Supposing that the current fails in the power source and therefore the solenoids 77 and 155 are both deactivated; without the presence of an additional security system like the one above explained, the brake blocks 15 are suddenly brought against the brake drum 19 thus abruptly braking the shaft 3. It will be appreciated that such an abrupt and sudden braking may cause damage to the cable 9 and break it under the jolting of heavy loads carried by cable 9. With the presence of the additional security system as above explained when the current is cut the auxiliary motor 327 is stopped along with the main motor activating the solenoids 77 or 155. However, the flywheel 329, due to its stored energy, operates the alternator 321 which by means of the relay 333 automatically enters into action and activates the solenoids 155 for a certain amount of time, lets say a few minutes, depending of the flywheel used, for permitting the smooth normal ascending or descending movement of the load 11 and the progressive deceleration thereof, thus providing a smooth landing of the load carried by the cable 9. It is evident that after a certain amount of time the energy stored by the flywheel 329 is consumed and the brake linings are again applied against the brake drum. The same additional security system as shown in FIG. 8 can, of course, also be employed in the embodiments of FIGS. 1 to 7.

The embodiments of the invention in which an exclusive property or privilege is claimed are defined as follows:

1. A brake arrangement, comprising:
   a brake drum mounted on a shaft;
   a fixed frame, located adjacent said brake drum;
   first and second brake support means, each being pivotally mounted at one end thereof to said fixed frame;
   a third brake support means pivoted at one end thereof to one of said first and said second support means;
   a pair of brake shoes, arranged on opposite sides of said brake drum;
   first connector means connecting one of said brake shoes with said third support means and said one of said first and second support means to which said third support means is pivoted, intermediate the ends of such support means, said first connector means being arranged as a lost motion connection whereby when said third support means and said one of said first and second support means to which said third support means is pivoted are fixed relative to each other said one brake shoe can be moved into and out of braking position by pivoting said one of said first and second support means, and whereby said one brake shoe can also be moved into and out of braking position by pivoting said third support means relative to said one of said first and second support means;
   second connector means connecting the other of said brake shoes to the other of said first and second support means, intermediate the ends thereof;
   first spring means mounted and arranged to bias the other ends of said first and second support means, and thus said brake shoes, toward each other in a braking action;
   first actuating means connected to one of said first and second supports and with said first spring means, arranged to be selectively operable to act against said first spring means to maintain said brake shoes in a nonbraking position; and
   second actuating means connected between the other ends of said third support means and said one of said first and second support means to which said third support means is pivoted, selectively operable to move said brake shoes to a braking position independently of said first actuating means.

2. A brake arrangement as claimed in claim 1, wherein said first actuating means includes a solenoid; and said second actuating means includes;
   a second spring means tending to bias relatively apart the other ends of said third support means and said one of said first and second support means to which said third support means is pivoted, so as to move said brake shoes to the braking position; and
   a second solenoid arranged and selectively operable for controlling the operation of said second spring means.

3. A brake arrangement as claimed in claim 1, wherein said first actuating means includes a solenoid, and said second actuating means includes;
   a casing having a movable projecting rod; and
   means arranged for directing fluid pressure to the casing to move the rod, said casing and said rod being connected and arranged so that when said rod is moved by said fluid pressure, it is effective to move apart said third support means relative to said one of said first and second support means to which said third support means is pivoted.

4. A brake arrangement as claimed in claim 1, wherein said second actuating means comprises:
   a solenoid actuated spring, said spring being mounted about a solenoid rod within a split cylindrical casing, one section of said casing being pivotably connected to the other, free end of said third brake support means,
   said solenoid rod passing axially through an end wall of one section of said casing, and a bolt being threaded onto said solenoid rod projecting from said end wall, the other section of said split cylindrical casing being connected to a block which is pivotably connected by bolts to the other end of said one of said first and second support means to which said third support means is pivoted; and
   a solenoid attached to said block, said solenoid rod extending through said block into said solenoid.

5. A brake arrangement as claimed in claim 1, wherein said second actuating means comprises:
   a cylindrical casing having end walls at its opposite ends, one of said end walls carrying connector means thereon, said connector means being pivotally connected to the other end of one of said third support means, and the one of said first and second support means to which said third support means is pivotally connected;
   a central collar mounted on the other end wall of said casing;
   a rod extending through and slidable relative to said central collar, the outer end of said rod being pivotally connected with the other end of the support means, and the one of said first and second support means to which said third support means is pivotally connected;
   a flexible membrane mounted centrally within said casing, and dividing said casing into first and second chambers;
   means connecting the inner end of said rod to said flexible membrane;
   a compression spring located in the second of said chambers, between said membrane and the other end wall of said casing;
   an inlet port in said one casing end wall, leading to the first of said chambers; and
   means for directing pressurized fluid through said inlet port into said first chamber.

6. A brake arrangement according to claim 1, further including:
   means for self-correcting the air-gap between linings provided on said brake shoes and said brake drum.

7. A brake arrangement according to claim 6, wherein said self-correcting means comprises a first and a second rod, said first rod having one end pivotally connected to one end of said first support means and said second rod having one end pivotally connected to one end of said second support means, each of said first and second rods having another end provided with a unidirectional self-adjusting element, said another end of each of said first and second rods being provided with a ring member, the ring member of said first rod and the ring member of said second rod being pivotally mounted with a clearance equal to said air-gap about a further shaft connected to said frame.

8. A brake arrangement according to claim 7, wherein said unidirectional self-adjusting elements are provided with means for permitting the displacement of each rod only in one direction.

9. A brake arrangement according to claim 8, wherein said unidirectional self-adjusting elements are each provided with release means for releasing each rod from the grips of its corresponding unidirectional self-adjusting elements.

10. A brake arrangement according to claim 6, further comprising a limit switch for operating on alarm signal when the brake linings are worn to a dangerous limit.

11. A brake arrangement according to claim 10, wherein said limit switch comprises a first part connected to said first support means and a second part connected to the second support means, said first and second parts inclining toward each other along with the inclination toward each other of said first and second support means.

12. A brake arrangement according to claim 6, further comprising an additional security system for permitting the smooth and progressive braking of said shaft to be braked in the event of a current failure thus permitting the smooth normal ascending or descending movement of a load.

13. A brake arrangement according to claim 12, wherein said additional security system comprises an auxiliary motor connected to a flywheel, said flywheel being connected to an alternator which is connected by means of a relay to said second solenoid.

* * * * *